(12) United States Patent
Money

(10) Patent No.: US 7,526,855 B1
(45) Date of Patent: May 5, 2009

(54) METHODS OF MANUFACTURING VOICE COIL MOTOR MAGNETIC RETURNS

(76) Inventor: James Bryant Money, 1360 Santa Inez Dr., San Jose, CA (US) 95125

( * ) Notice: Subject to any disclaimer, the term of this patent is extended or adjusted under 35 U.S.C. 154(b) by 446 days.

(21) Appl. No.: 11/211,980

(22) Filed: Aug. 25, 2005

(51) Int. Cl.
*H01F 41/14* (2006.01)
*H02K 15/03* (2006.01)
(52) U.S. Cl. ............... 29/603.03; 29/596; 360/264.8
(58) Field of Classification Search ............ 29/596, 29/598, 603.01, 603.13, 603.14, 846, 603.03; 360/264.7, 264.8, 264.9; 427/104, 128, 131, 427/132; 310/12, 15, 36
See application file for complete search history.

(56) References Cited

U.S. PATENT DOCUMENTS 6,941,637 B2 * 9/2005 Fukunaga et al. ............ 29/596

FOREIGN PATENT DOCUMENTS

JP 2002262523 A * 9/2002

* cited by examiner

*Primary Examiner*—A. Dexter Tugbang
*Assistant Examiner*—Livius R Cazan

(57) ABSTRACT

Methods to make rotary and linear voice coil motors, having either single air gaps or dual air gaps. A first embodiment of the invention involves a method to manufacture voice coil motor magnetic returns on a substrate. A second embodiment of the invention involves a method to manufacture a plurality of voice coil motor magnet assembly ends from voice coil motor magnetic returns on a substrate. A third embodiment involves a method to manufacture voice coil motors from voice coil motor magnet assembly ends.

13 Claims, 16 Drawing Sheets

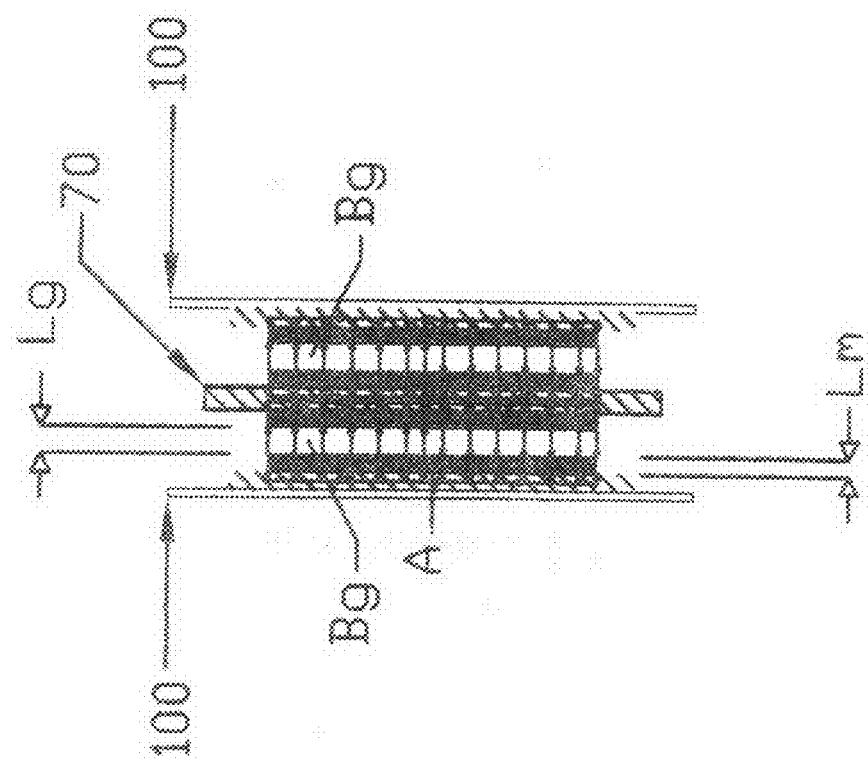
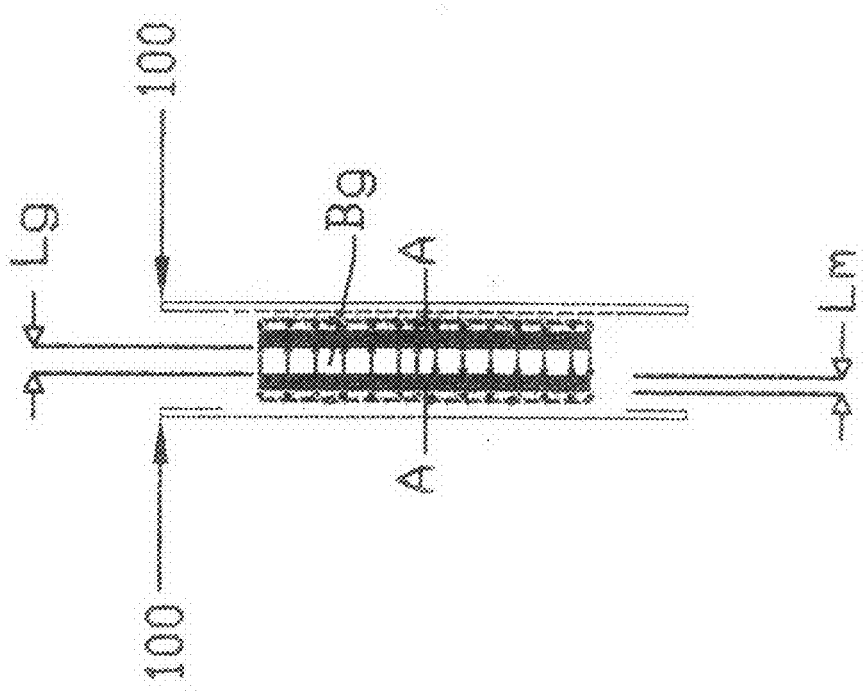
Figure 9

METHODS OF MANUFACTURING VOICE COIL MOTOR MAGNETIC RETURNS

BACKGROUND

1. Field of Invention

This invention relates to the design and manufacturing of rotary and linear high performance voice coil motors (VCMs) suitable for use in hard disk drives and optical storage devices, and in particular to VCMs used in markets where small form factors and/or high torque are desired.

2. Description of Prior Art

Disk drives have predominately used rotary actuators for positioning the read/write heads while optical storage devices, such as CDs and DVDs, have used linear actuators. Both actuators are driven by voice coil motors (VCMs), which consist of permanent magnets, mounted in a magnetic return structure that generates a magnetic field in an air gap. The torque (or force) produced by the VCM is directly proportional to the magnetic field intensity the air gap. Therefore, it is desirable to maximize the magnetic field intensity in the air gap to achieve maximum torque (force) per unit of current.

Today's VCMs suffer from several design and manufacturing deficiencies that limit their ability to produce high magnetic field intensity in the air gap. These are:

- The material used in the motors magnetic return path has relativity low magnetic saturation, typically 0.6 to 1.0 Tesla.
- The material used in the motors magnetic return path has low permeability versus frequency thus becoming inefficient for today's high band-pass servo systems.
- Dimensional tolerances of VCM parts are quite large.
- Large air gap.
- Small magnet length to air gap length (load line). This limits the use of high-energy permanent magnets available in the market today.

In view of the foregoing, what is needed are improved design and manufacturing methods to efficiently manufacture voice coil motors parts and manufacture voice coil motors capable of producing a higher magnetic field intensity in their air gaps.

SUMMARY OF THE INVENTION

The present invention includes design and manufacturing methods that overcome the deficiencies of the prior art, and can be used for either single air gap or dual air gap voice coil motors for various types of drives. The invention can be implemented in several alternative ways to build single air gap and dual air gap rotary and linear voice coil motors. Four aspects of the invention are described below.

A first aspect of the invention is directed to a method to manufacture voice coil motor magnetic returns on a substrate having a front surface and a back surface. The method includes depositing a conductive seed layer on the front surface of the substrate; depositing photoresist over the conductive seed layer on the front surface of the substrate; exposing and then developing the photoresist on the front surface of the substrate; depositing alternating layers of conducting material and magnetic material over the photoresist over the front surface of the substrate; stripping the photoresist from the front surface of the substrate; and annealing the front surface of the substrate, wherein the annealing produces voice coil motor magnetic returns having at least one selected magnetic property.

A second aspect of the invention is directed to a method to manufacture voice coil motor magnetic returns on a substrate having a front surface and a back surface. The method includes depositing a conductive seed layer on the front surface of the substrate; depositing a conductive seed layer on the back surface of the substrate; depositing photoresist over the conductive seed layer on the front surface of the substrate; depositing photoresist over the conductive seed layer on the back surface of the substrate; exposing and then developing the photoresist on the front surface of the substrate; exposing and then developing the photoresist on the back surface of the substrate; depositing alternating layers of conducting material and magnetic material over the photoresist over the front surface of the substrate; depositing alternating layers of conducting material and magnetic material over the photoresist over the back surface of the substrate; stripping the photoresist from the front surface of the substrate; stripping the photoresist from the back surface of the substrate; annealing the front surface of the substrate; and annealing the back surface of the substrate, wherein the annealing produces voice coil motor magnetic returns having at least one selected magnetic property.

A third aspect of the invention is directed to a method to manufacture voice coil motor magnet assembly ends from voice coil motor magnetic returns on a front surface of a substrate. The method includes securing permanent magnets over the voice coil motor magnetic returns on the front surface of the substrate; grinding the permanent magnets to a selected dimension relative to the front surface of the substrate using a surface grinding mechanism; magnetizing the permanent magnets to produce at least one voice coil motor magnet assembly end; and separating at least one voice coil motor assembly end from the front surface of the substrate.

A fourth aspect of the invention is directed to a method to manufacture voice coil motors. The method includes positioning at least one precision spacer for a voice coil motor magnet assembly end on a front surface of a first substrate; aligning the first voice coil motor magnet assembly end on the front surface of the first substrate to a second voice coil motor magnet assembly end on a front surface of a second substrate; and attaching the first voice coil motor magnet assembly end to the second voice coil motor magnet assembly end on the front surface of the second substrate.

These and other objects and advantages of the invention will become apparent to those skilled in the art from the following detailed description of the invention and the accompanying drawings.

BRIEF DESCRIPTION OF THE DRAWINGS

FIG. 9 illustrates the magnetic flux flow in both a single air gap VCM and a dual air gap VCM assembly, in accordance with one embodiment of the invention.

DETAILED DESCRIPTION OF THE PREFERRED EMBODIMENT

Figure 1:
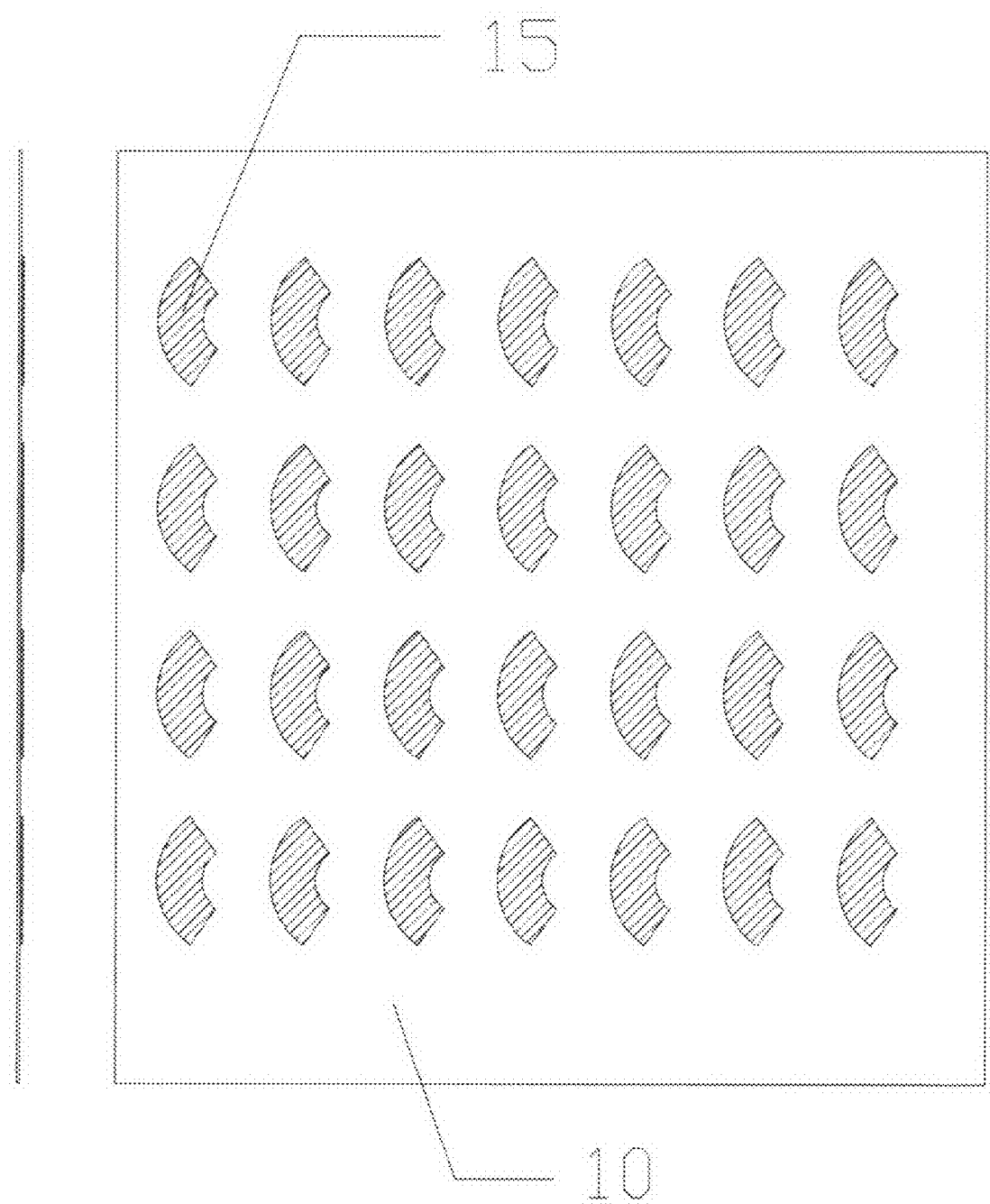
FIG. 1 illustrates the front and profile view of the electroplated magnetic returns, in accordance with one embodiment of the invention.

FIG. 1 illustrates the front and profile view of substrate 10 upon which multiple magnetic returns 15 have been fabricated, in accordance with one embodiment of the invention. In the preferred embodiment, substrate 10 is a high strength ceramic having high specific modulus and toughness. Fabrication of the magnetic returns includes:

Sputtering conductive seed layer on one surface of substrate 10.

Applying dry photoresist to the surface having the seed layer.

Exposing photoresist and developing it.

Electroplating alternating layers of Cu and a CoFeCu alloy to achieve a laminated soft magnetic material has a high saturation magnetization (2.4 Tesla) and good magnetic permeability versus frequency (low eddy current loss). In one embodiment of the invention, this can be electroplated from a single plating solution.

Stripping the photoresist and annealing the magnetic material on the substrate to achieve maximum optimal magnetic properties.

Figure 2:
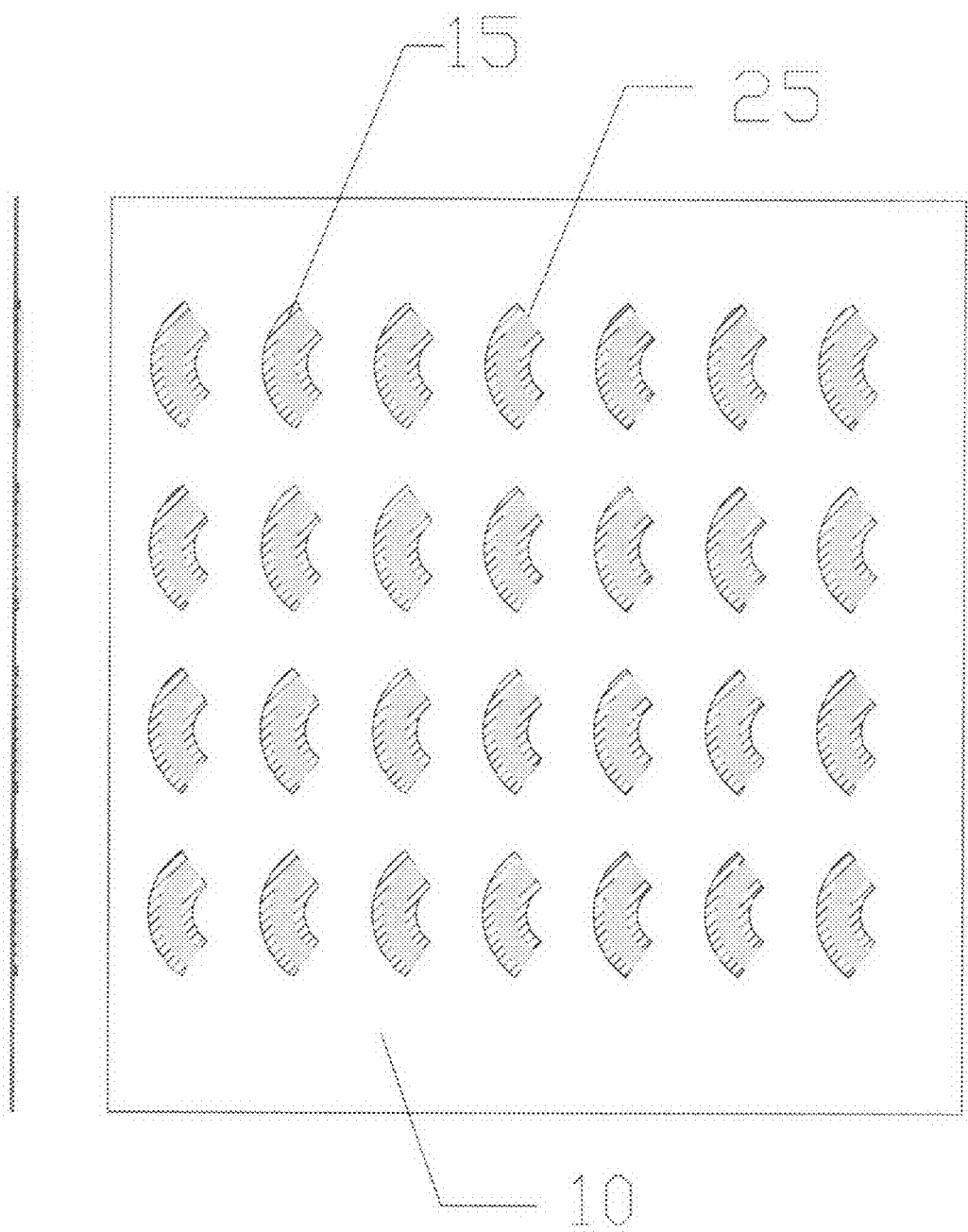
FIG. 2 illustrates the front and profile view of the mounted permanent magnets, in accordance with one embodiment of the invention.

FIG. 2 illustrates a front and profile view of high-energy neodymium-iron-boron (Nd—Fe—B) permanent magnets 25 mounted to the substrate 10 over the magnetic returns 15, in accordance with one embodiment of the invention. The magnets are secured to the substrate with an adhesive and the substrate is then mounted on a surface grinder (or an equivalent abrading device) where the faces of the Nd—Fe—B magnets are ground to a precise dimension H (where H is the height of the top of the Nd—Fe—B magnets relative to the face of the substrate). The magnets are then magnetized, into two equal segments, perpendicular to their faces. The substrate 10 can now be coated with a thin sputtered film of aluminum oxide ($Al_2O_3$) for protection (e.g., corrosion protection, or mechanical protection) if desired.

Figure 3:
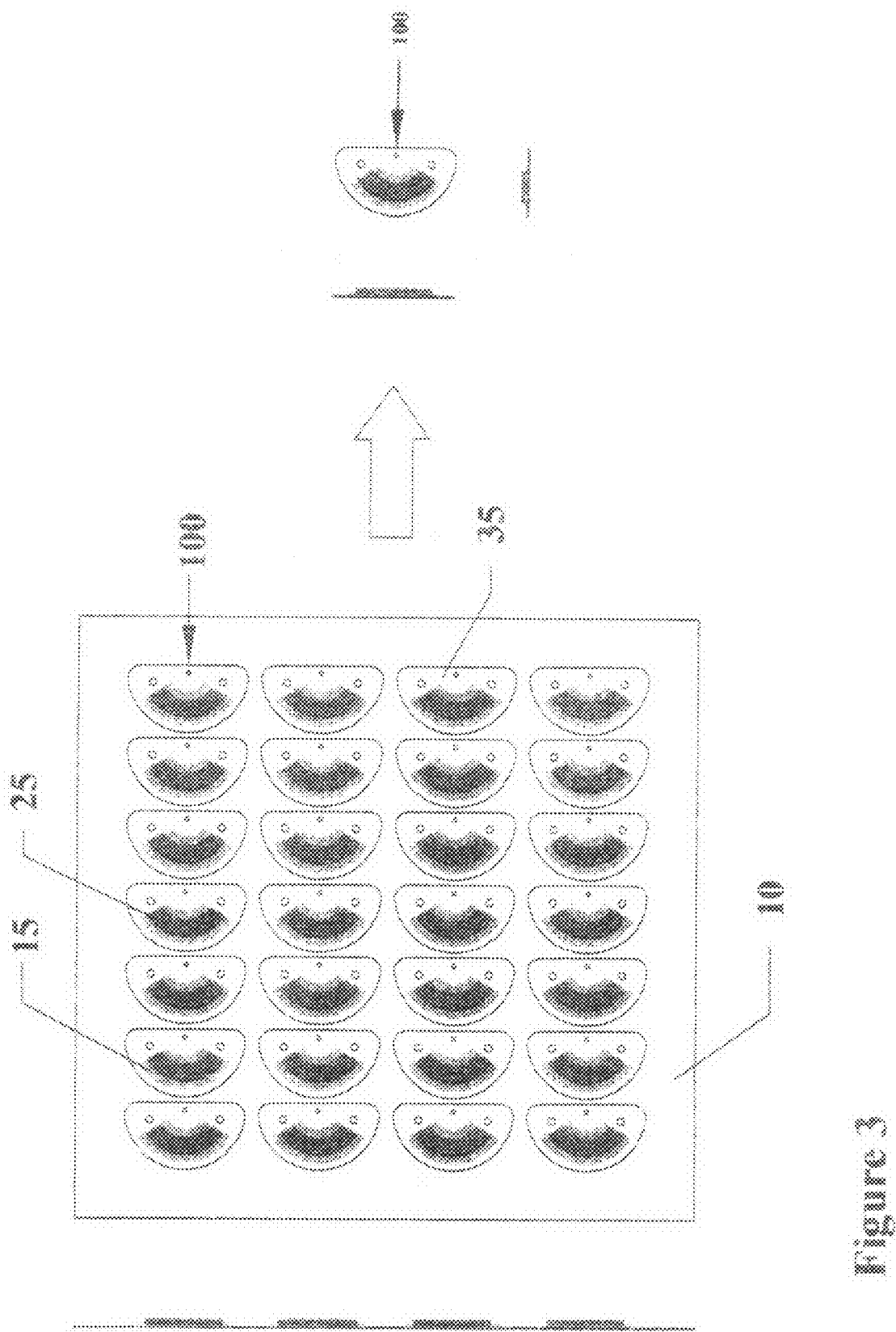
FIG. 3 illustrates the laser-machining pattern for separating rotary Magnet Assembly-End from the substrate, in accordance with one embodiment of the invention.

FIG. 3 illustrates a front and profile view of the laser cutting required to obtain a completed Magnet Assembly-End 100, in accordance with one embodiment of the invention.

Figure 4:
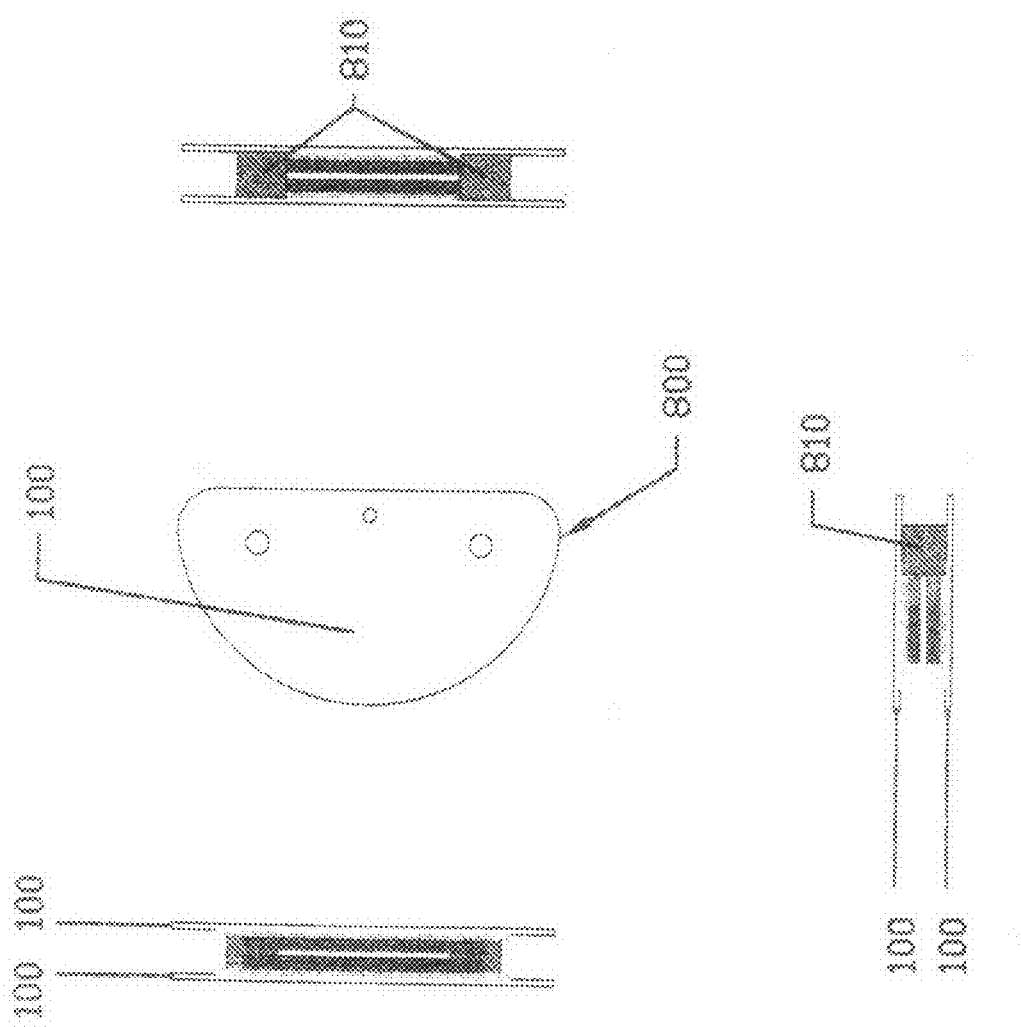
FIG. 4 illustrates the top, front and profile views of the Single Air Gap Rotary VCM, in accordance with one embodiment of the invention.

FIG. 4 illustrates the front, top and profile views of a Single Air Gap Voice Coil Motor (SAG-VCM) 800 having a small and precise air gap, in accordance with one embodiment of the invention. It includes two Magnet Assemblies-End 100, and two precision spacers 810.

The precision spacers 810 are secured to the Magnet Assemblies-End 100 with an adhesive. Note that the air gap is controlled by the precision spacers and the gap is equal to:

$$\text{Air gap} = \text{length of spacer} - 2 \times H \quad (1)$$

Figure 5:
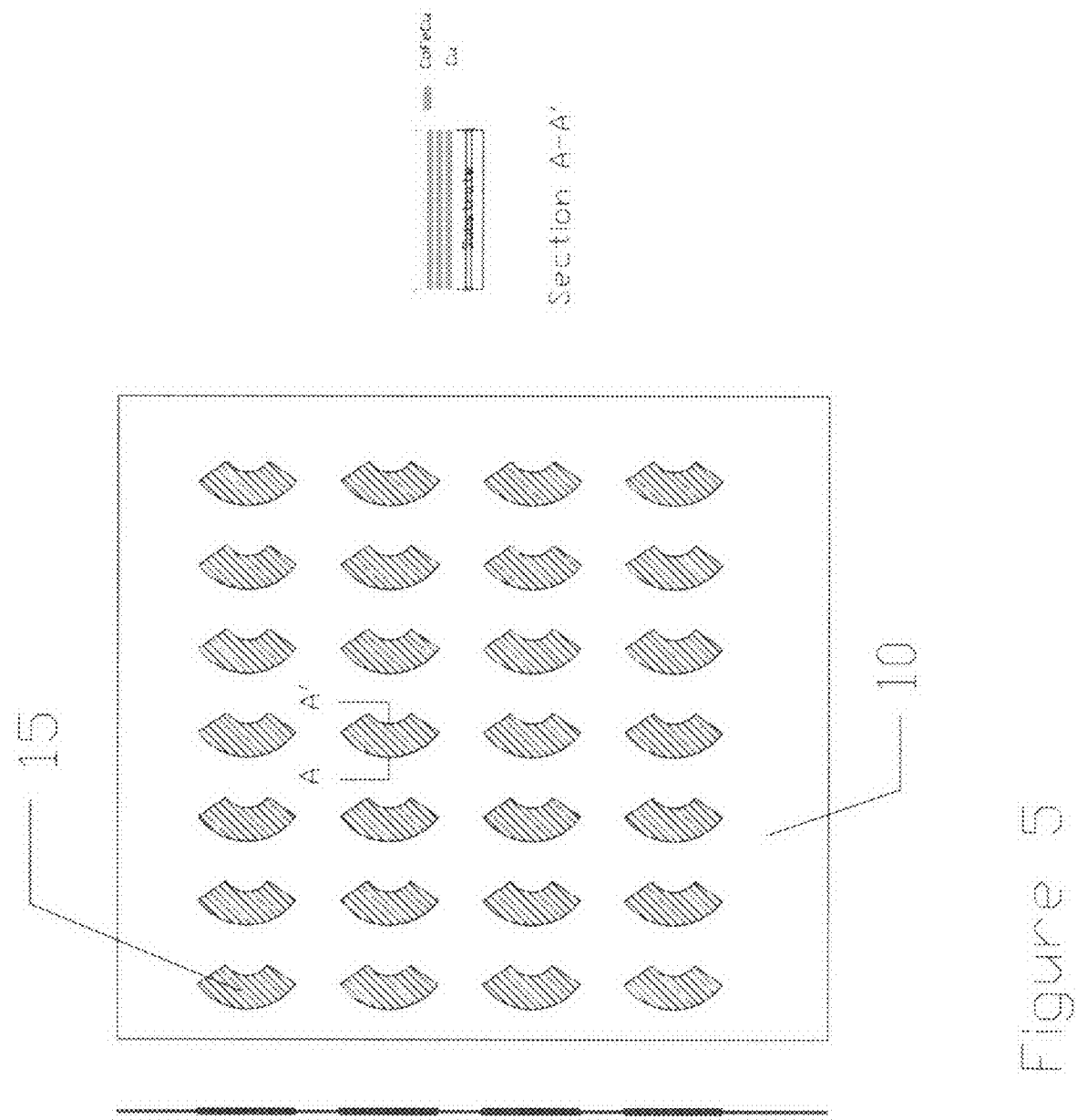
FIG. 5 illustrates the front and profile view of the electroplated magnetic returns, in accordance with one embodiment of the invention.

FIG. 5 illustrates the front and profile view of substrate 10 upon which multiple magnetic returns 15 have been fabricated on both surfaces, in accordance with one embodiment of the invention. In one embodiment of the invention, substrate 10 is a high strength ceramic having high specific modulus and toughness, and fabrication of the magnetic returns includes:

Sputter conductive seed layer on both surfaces of substrate 10.

Apply dry photoresist to both surfaces.

Expose photoresist and develop.

Electroplate alternating layers of Cu and a CoFeCu alloy. This laminated soft magnetic material has high saturation magnetization (2.4 Tesla) and good magnetic permeability versus frequency (low eddy current loss) and can be electroplated from a single plating solution.

The photoresist is stripped and the magnetic material on the substrate is annealed to achieve maximum optimal magnetic properties.

Figure 6:
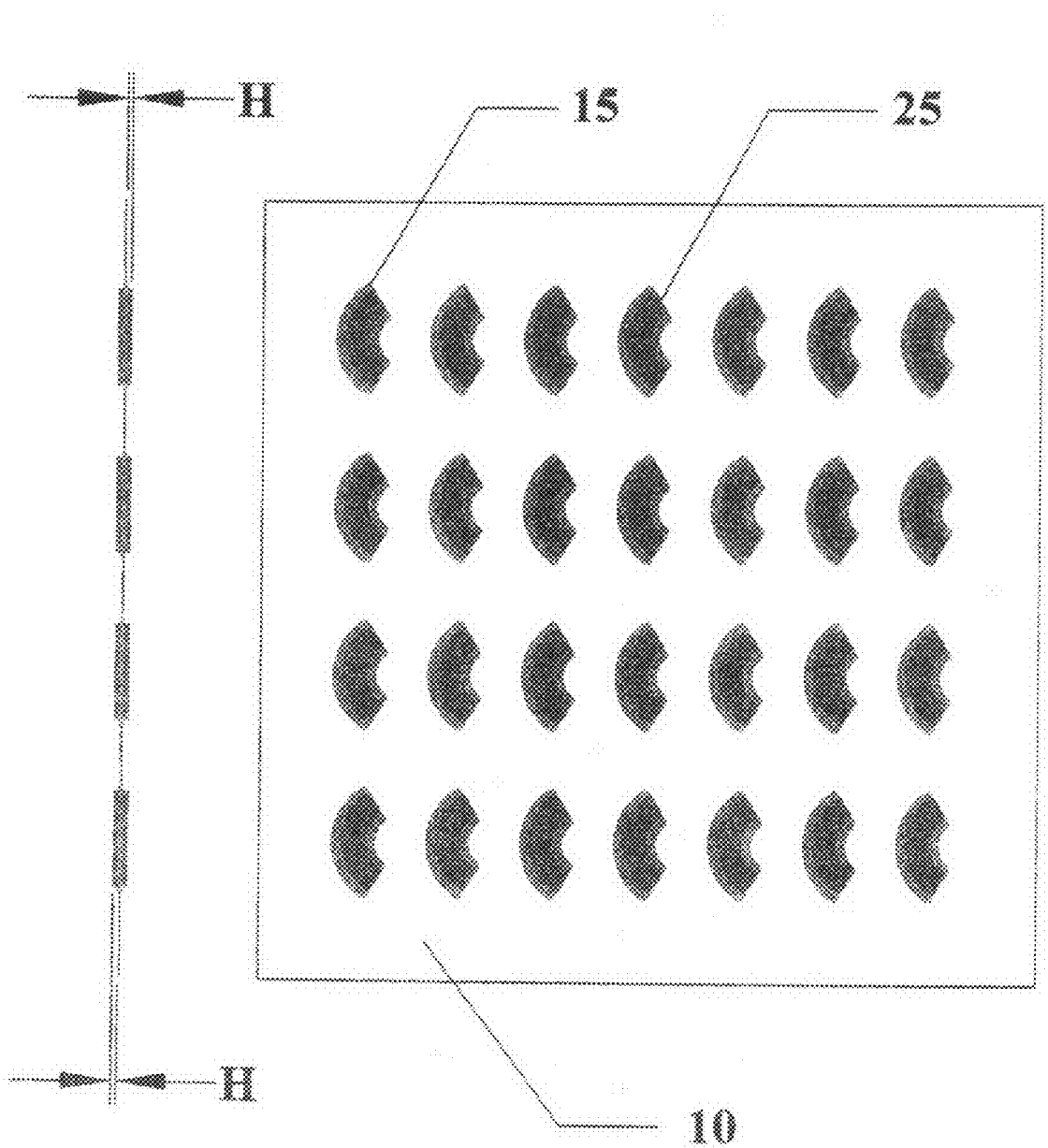
FIG. 6 illustrates the front and profile view of the mounted permanent magnets, in accordance with one embodiment of the invention.

FIG. 6 illustrates the front and profile view of high-energy Nd—Fe—B permanent magnets 25 mounted to both surfaces of substrate 10 over the magnetic returns 15, in accordance with one embodiment of the invention. The magnets are secured to the substrate with an adhesive. Any strong and chemically compatible commercially available adhesive can be used. The faces of the Nd—Fe—B magnets are ground to a precise dimension H relative to the face of the substrate (where H is the height of the Nd—Fe—B magnets relative to the face of the substrate). The magnets are then magnetized, into two equal segments, perpendicular to their faces. The substrate 10 can now be coated, on both surfaces, with a thin sputtered film of aluminum oxide ($Al_2O_3$) for corrosion protection if desired.

Figure 7:
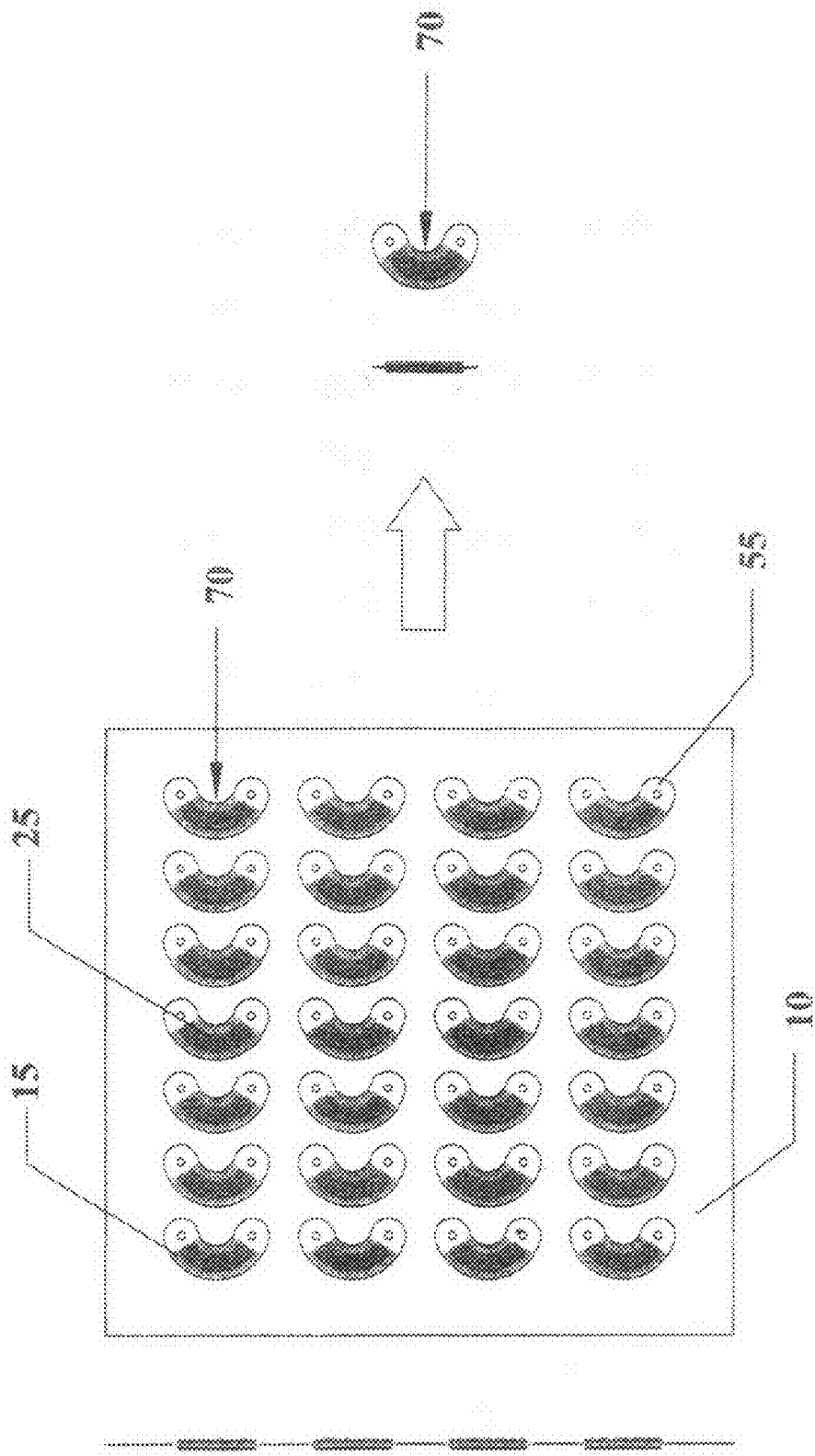
FIG. 7 illustrates the laser-machining pattern for separating rotary Magnet Assembly-Center from the substrate, in accordance with one embodiment of the invention.

FIG. 7 illustrates the front and profile view showing the laser cutting required to obtain a completed Magnet Assembly-Center 70, in accordance with one embodiment of the invention.

Figure 8:
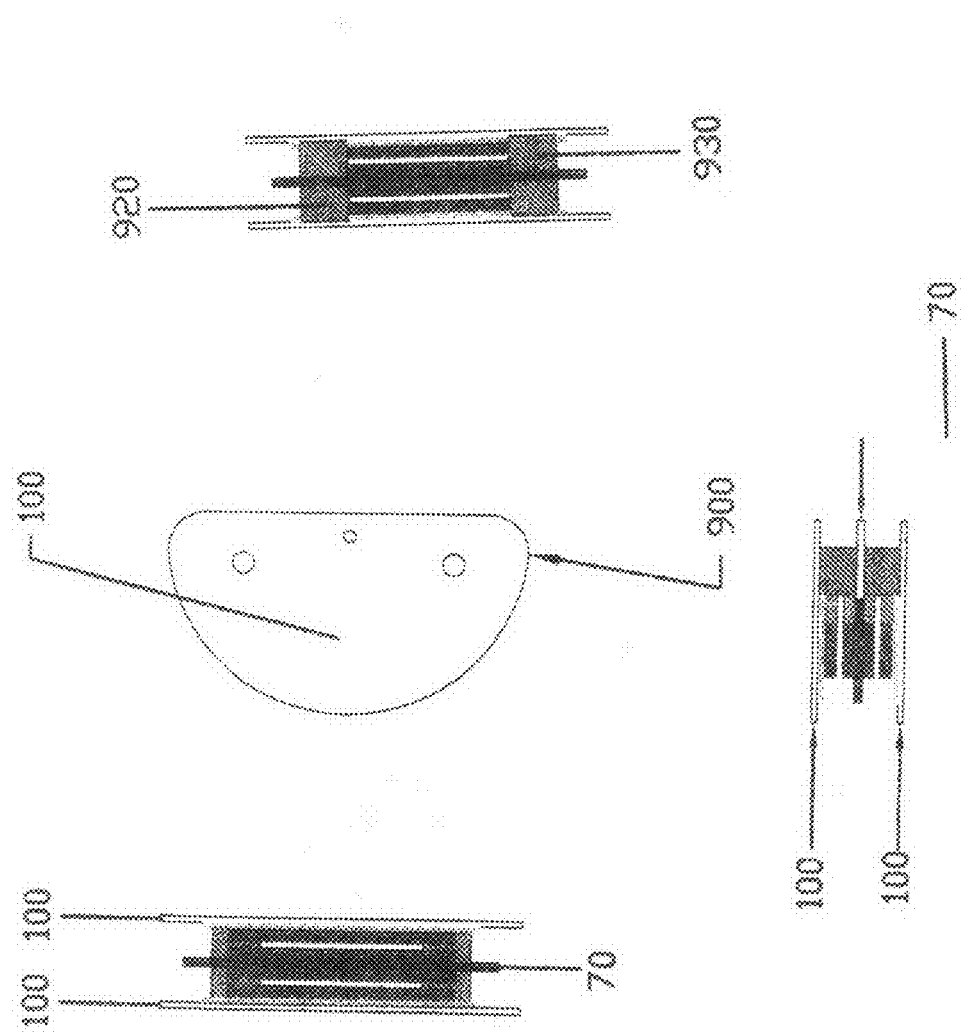
FIG. 8 illustrates the top, front and profile views of the Dual Air Gap Rotary VCM.

FIG. 8 illustrates the front, top and profile views of a dual air gap Voice Coil Motor (DAG-VCM) 900 having a small and precise air gaps, in accordance with one embodiment of the invention. It includes two Magnet Assemblies-End 100, one Magnet Assembly-Center 70, two lower precision spacers 930, and two upper precision spacers 920.

Operation

FIG. 9 illustrates the magnetic flux flow in both a single air gap VCM 800 and a dual air gap VCM 900 assembly, in accordance with one embodiment of the invention. The permanent magnets were magnetized into two equal segments of opposite polarity about line A-A. To calculate the flux density Bg, in the air gap, an approximation can be made by assuming that there is no magnetic potential drop across the magnetic returns and that the magnetic potential, produced by the permanent magnets, diminishes solely across the air gaps (assuming a CGS air gap magnetic permeability of unity).

$$B_g = (L_m/L_g)H_m \quad (2)$$

Where $B_g$=Flux Density in air gap (Gauss), $H_m$=Coercivity (Oersteds), $L_m$=Length of magnet (meters), $L_g$=Length of air gap (meters), and $L_m/L_g$=Load Line.

Figure 10:
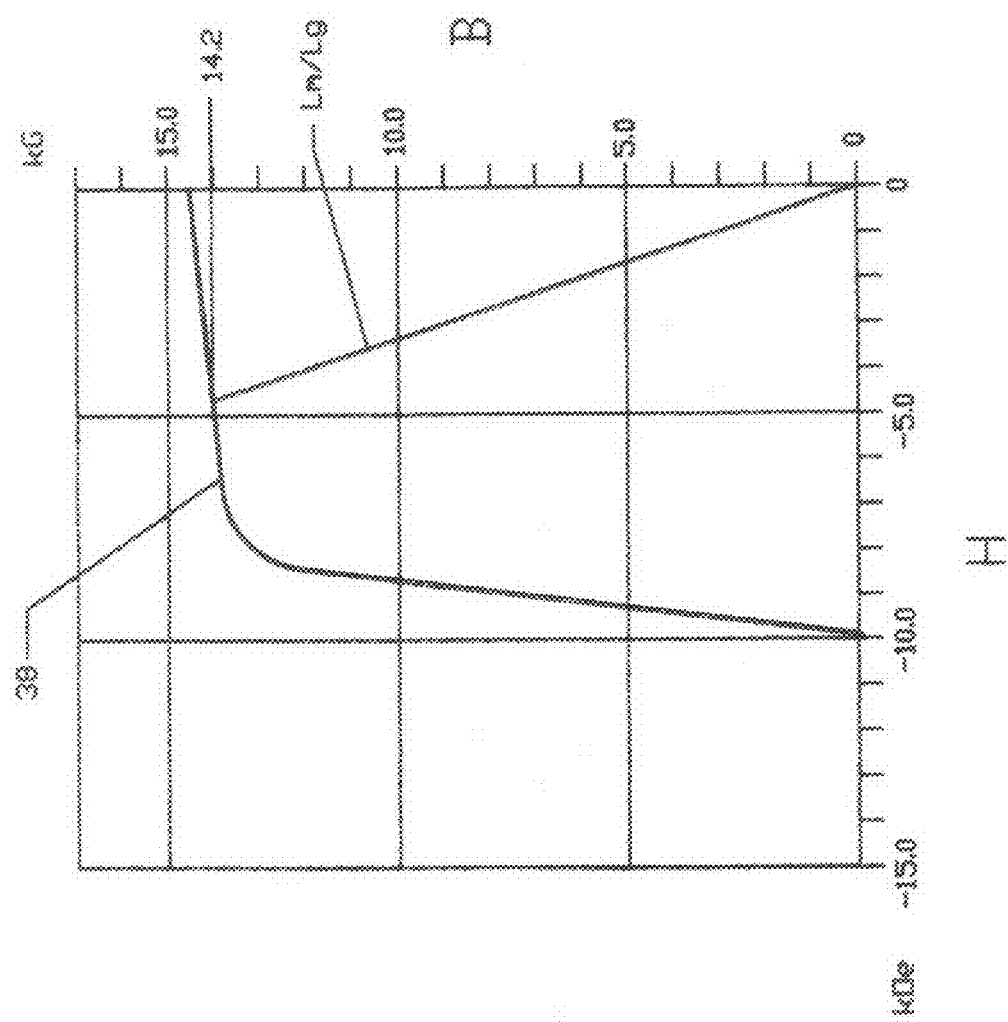
FIG. 10 illustrates the demagnetization curve of a high-energy permanent magnet and a load line of 3, in accordance with one embodiment of the invention.

FIG. 10 illustrates the demagnetization curve 38 for a high-energy neodymium-iron-boron (Nd—Fe—B) permanent magnet, in accordance with one embodiment of the invention. The Nd—Fe—B permanent magnet has a demagnetization curve 38 with the following salient magnetic properties.

| | |
|---|---|
| Maximum Energy Product ($BH_{max}$) | 52 ($MGO_e$) |
| Residual Induction ($B_r$) | 14.4 (kG) |
| Coercivity ($H_c$) | 10.3 ($kO_e$) |

To effectively utilize this high-energy magnetic material, a design having a nominal load line of 3 is required and this is shown in FIG. 10. The horizontal axis is the H field in kilo-Oersteds, and the vertical axis is the B field in kilo-Gauss. The CGS magnetic permeability of the air gap is assumed to be unity. The intersection of the load line ($L_m/L_g$) with the permanent magnets demagnetization curve 38 gives the value of $B_g$, the flux density in the air gap (in Gauss and Tesla units).

$$B_g = 14.2 \text{ kG} = 1.42 \text{ Tesla} \quad (3)$$

Figure 11:
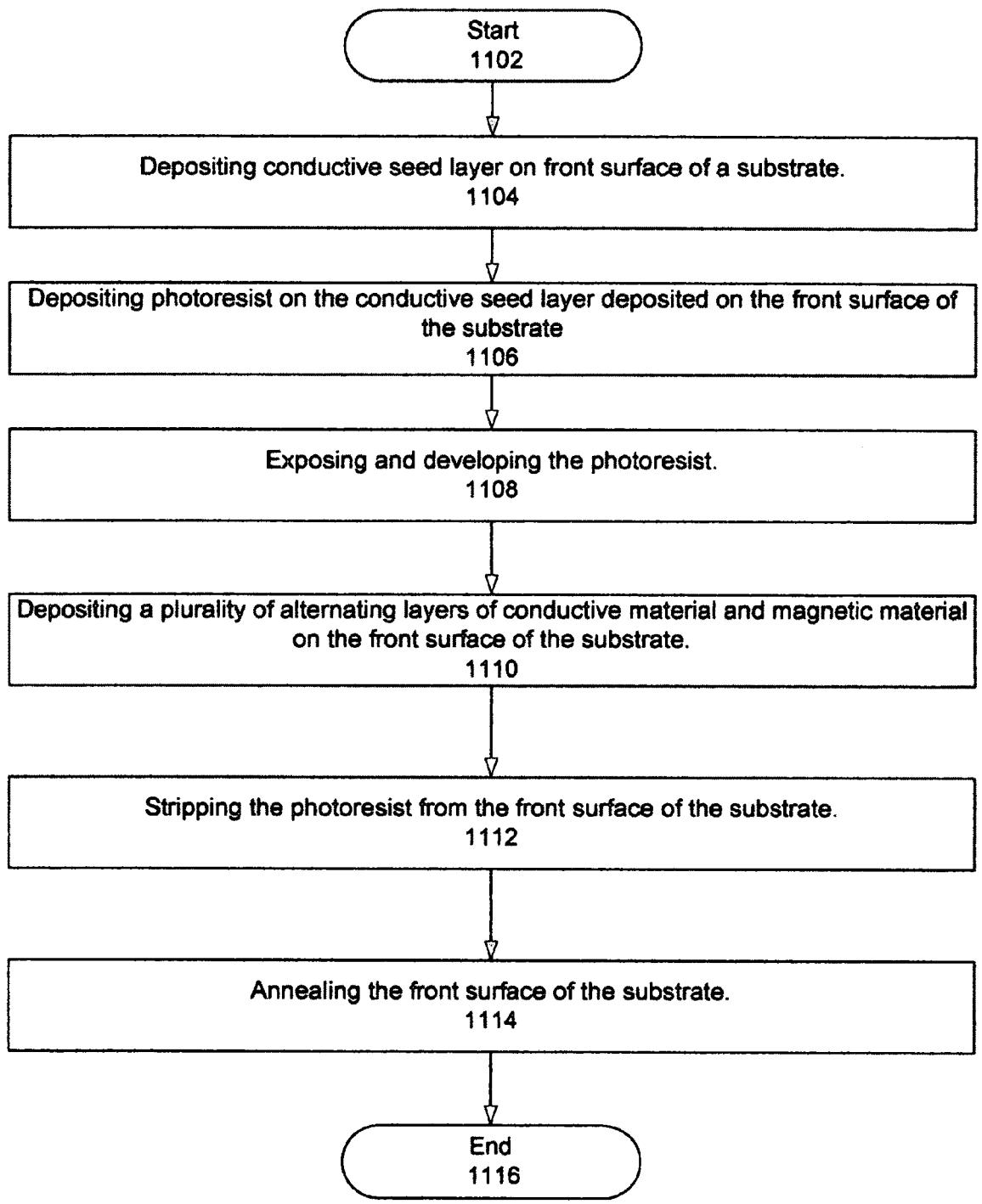
FIG. 11 illustrates a flowchart for making voice coil motor magnetic returns, in accordance with one embodiment of the invention.

FIG. 11 illustrates a flowchart for a method of making voice coil motor magnetic returns, in accordance with one embodiment of the invention. The method shown in this and later flowcharts would be applicable to the manufacture of linear voice coil motors and rotary voice coil motors. The method begins in operation 1102. The next operation is 1104 and includes depositing conductive seed layer on the front surface of a substrate. The conductive seed layer can include any conductive material sufficient for the needs of electroplating. The substrate can include any appropriate substrate material (e.g., a ceramic, glass, or equivalents). The next operation is 1106 and includes depositing photoresist on the conductive seed layer deposited on the front surface of the substrate. The next operation is 1108 and includes exposing and developing the photoresist. This operation in one embodiment of the invention could include using ultraviolet light or other equivalent methods. The next operation is 1110 and includes depositing a plurality of alternating layers of conductive material and magnetic material on the front surface of the substrate. In one embodiment of the invention, this would include depositing alternating layers of copper as the conductive material and a cobalt-iron-copper alloy as the magnetic material. The next operation is 1112 and includes stripping the photoresist from the front surface of the substrate. Stripping could include chemical stripping, plasma etch stripping, or an equivalent process. The next operation is 1114 and includes annealing the front surface of the substrate. The annealing is used to produce a plurality of voice coil motor magnetic returns having selective magnetic properties. The method ends in operation 1116.

Figure 12:
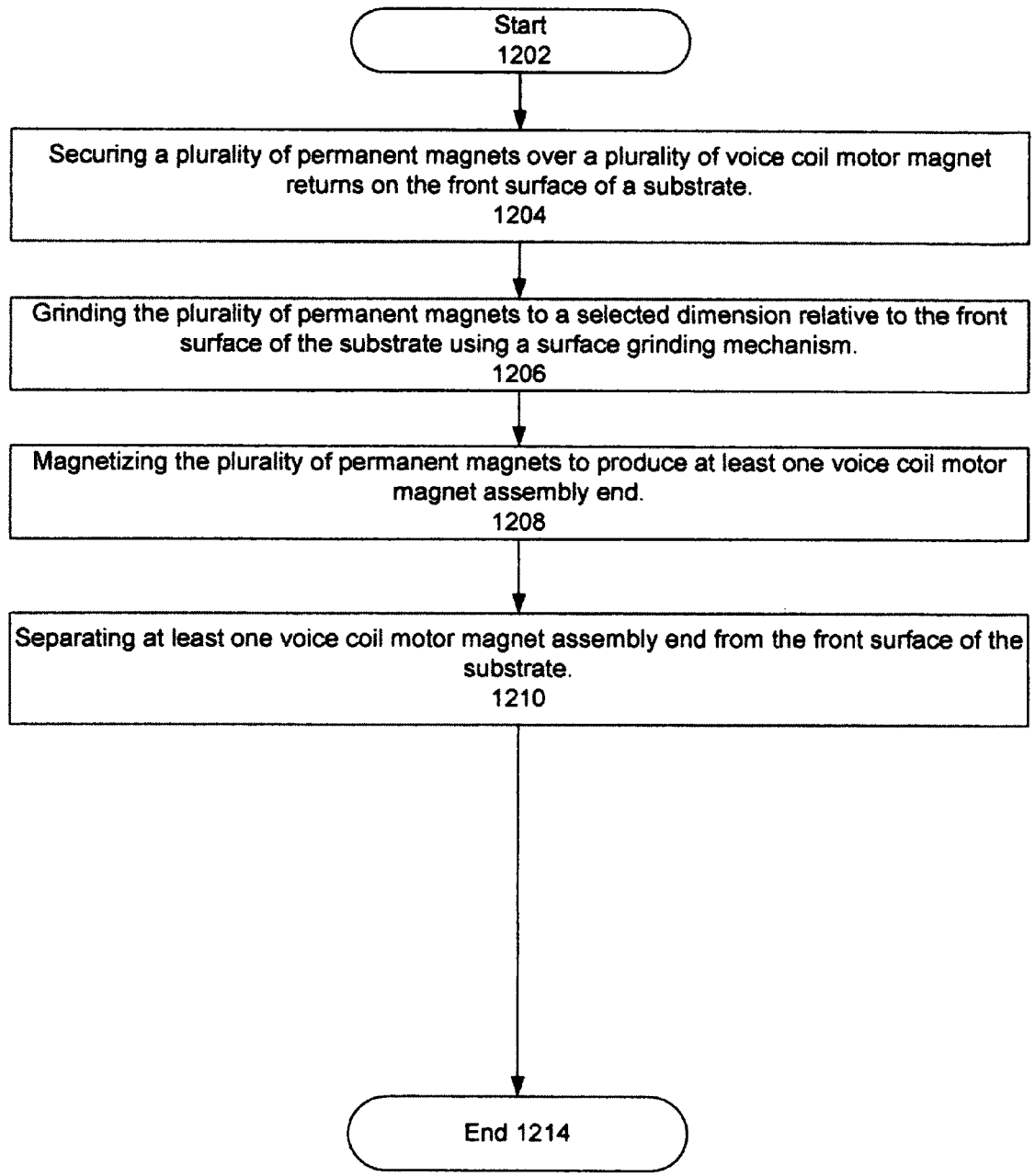
FIG. 12 illustrates a flowchart for making voice coil motor magnet assembly ends from a plurality of voice coil motor magnetic returns, in accordance with one embodiment of the invention.

FIG. 12 illustrates a flowchart for making voice coil motor magnet assembly ends from a plurality of voice coil motor magnetic returns, in accordance with one embodiment of the invention. The process begins in operation 1202. The next operation is 1204 and includes securing a plurality of permanent magnets over said plurality of voice coil motor magnetic returns on the front surface of a substrate. The next operation is 1206 and includes grinding the plurality of permanent magnets to a selected dimension relative to the front surface of the substrate using a surface grinding mechanism. The next operation is 1208 and includes magnetizing at least one of the plurality of permanent magnets to produce at least one voice coil motor magnet assembly end. The next operation is 1210 and includes separating at least one voice coil magnet assembly end from the front surface of the substrate. The method ends in operation 1214.

Figure 13:
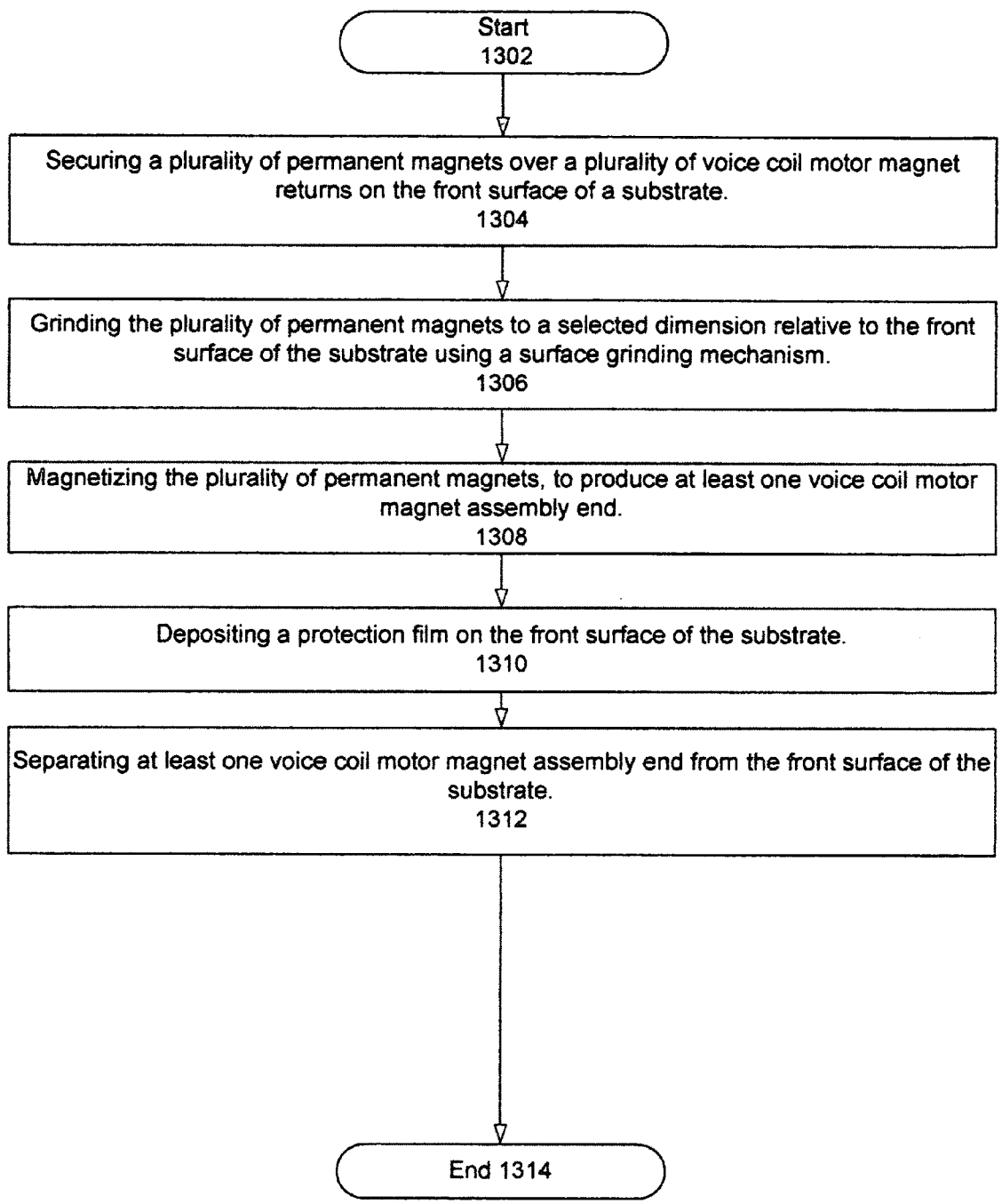
FIG. 13 illustrates a flowchart for making voice coil motor magnet assembly ends from a plurality of voice coil motor magnetic returns, in accordance with one embodiment of the invention.

FIG. 13 illustrates a flowchart for making voice coil motor magnet assembly ends from a plurality of voice coil motor magnetic returns, in accordance with one embodiment of the invention. The process begins in operation 1302. The next operation is 1304 and includes securing a plurality of permanent magnets over said plurality of voice coil motor magnetic returns on the front surface of a substrate. The next operation is 1306 and includes grinding the plurality of permanent magnets to a selected dimension relative to the front surface of the substrate using a surface grinding mechanism. The next operation is 1308 and includes magnetizing at least one of the plurality of permanent magnets to produce at least one voice coil motor magnet assembly end. The next operation is 1310 and includes depositing a protection film on the front surface of the substrate. The next operation is 1312 and includes separating at least one voice coil motor magnet assembly end from the front surface of the substrate. The method ends in operation 1314.

Figure 14:
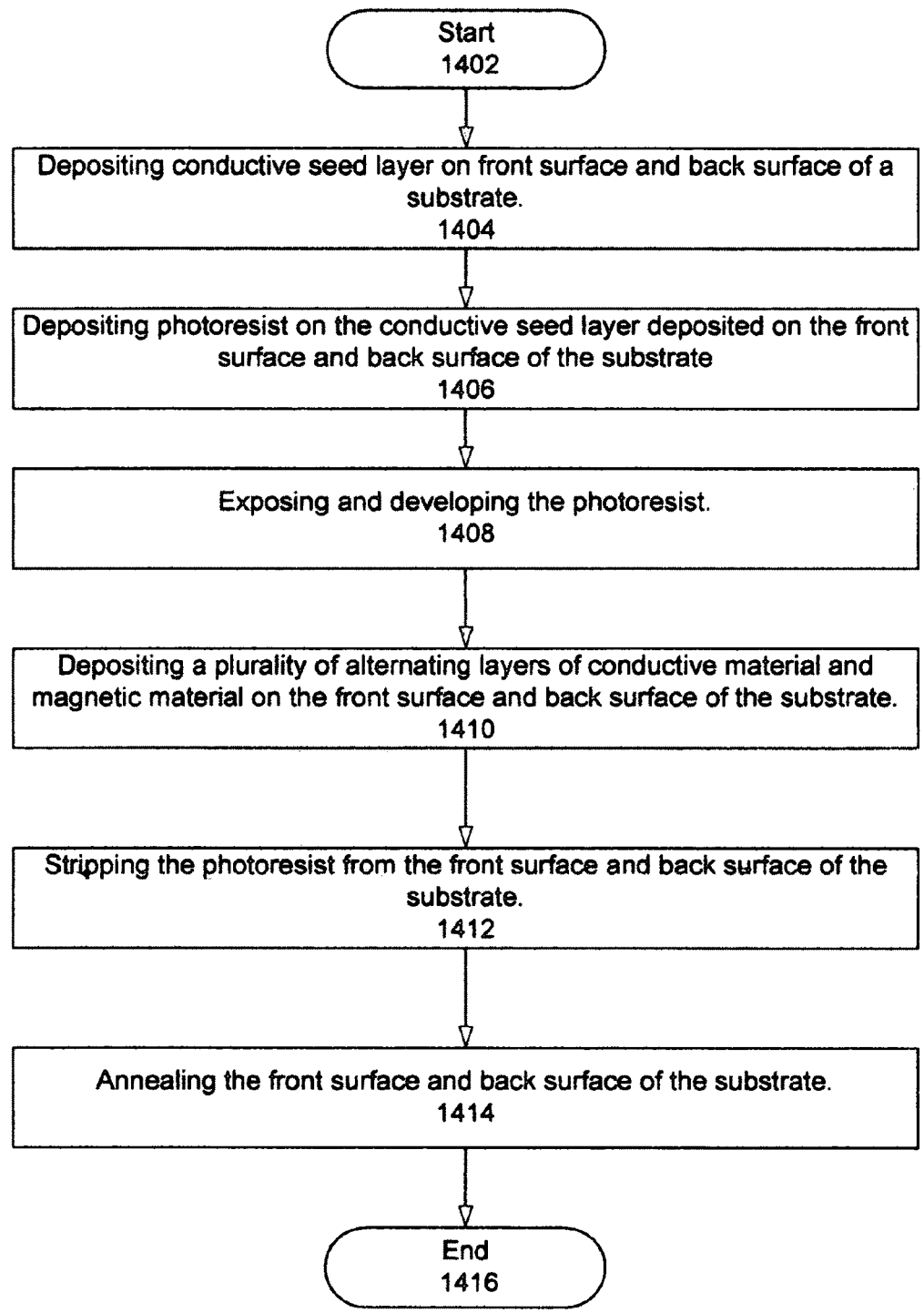
FIG. 14 illustrates a flowchart for making voice coil motor magnetic returns, in accordance with one embodiment of the invention.

FIG. 14 illustrates a flowchart for making voice coil motor magnetic returns, in accordance with one embodiment of the invention. The method begins in operation 1402. The next operation is 1404 and includes depositing conductive seed layer on the front surface and back surface of a substrate. The conductive seed layer can include any conductive material sufficient for the needs of electroplating. The substrate can include any appropriate substrate material (e.g., a ceramic, glass, or equivalents). The next operation is 1406 and includes depositing photoresist on the conductive seed layer deposited on the front surface and back surface of the substrate. The next operation is 1408 and includes exposing and developing the photoresist. This operation in one embodiment of the invention could include using ultraviolet light or other equivalent methods. The next operation is 1410 and includes depositing a plurality of alternating layers of conductive material and magnetic material on the front surface and back surface of the substrate. In one embodiment of the invention, this would include depositing alternating layers of copper as the conductive material and a cobalt-iron-copper alloy as the magnetic material. The next operation is 1412 and includes stripping the photoresist from the front surface and back surface of the substrate. Stripping could include chemical stripping, plasma etch stripping, or an equivalent process. The next operation is 1414 and includes annealing the front surface and back surface of the substrate. The annealing is used to produce a plurality of voice coil motor magnetic returns having selective magnetic properties. The method ends in operation 1416.

Figure 15:
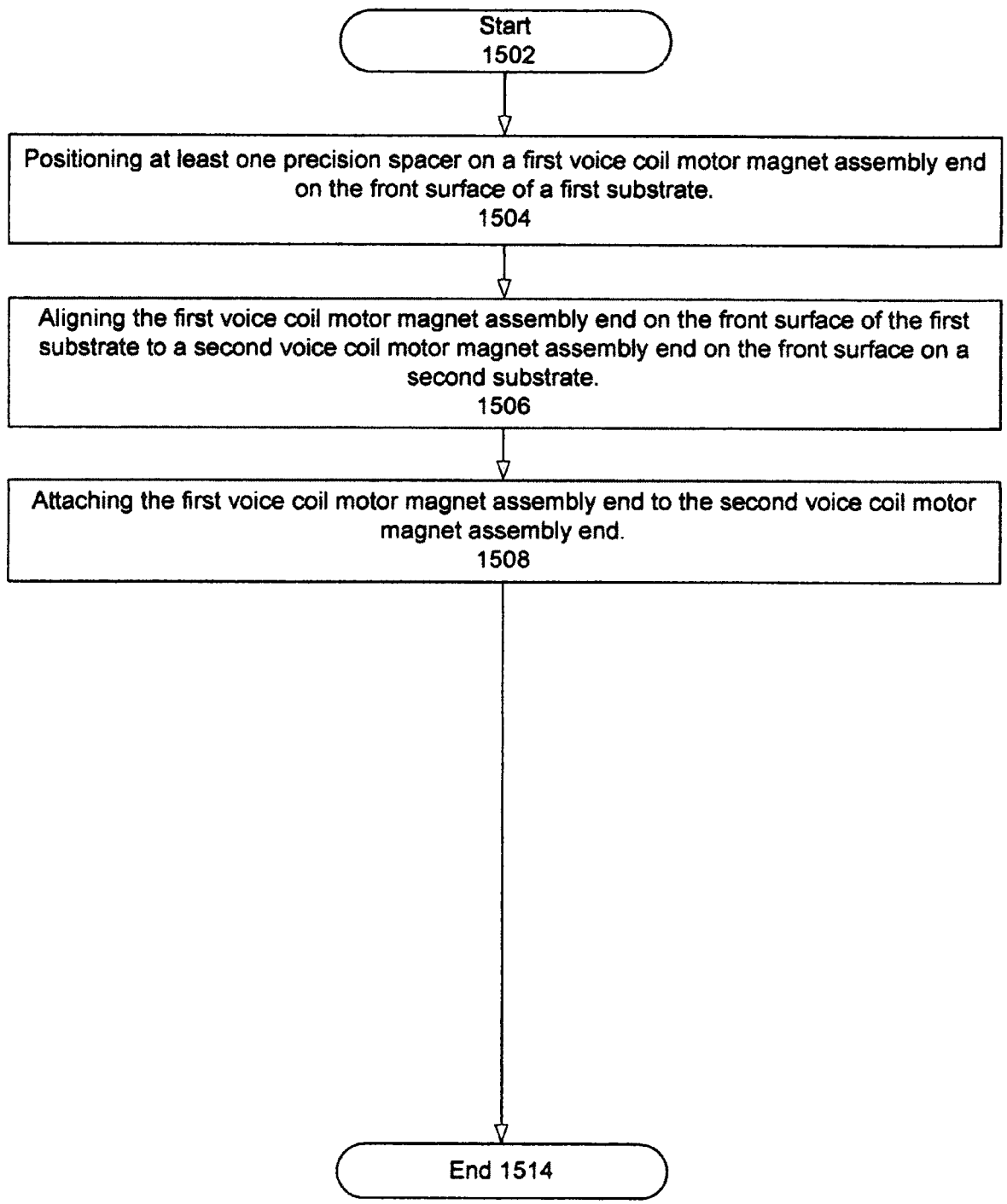
FIG. 15 illustrates a flowchart for making voice coil motors, in accordance with one embodiment of the invention.

FIG. 15 illustrates a flowchart for making voice coil motors, in accordance with one embodiment of the invention. The method begins in operation 1502. The next operation is 1504 and includes positioning at least one precision spacer for a first voice coil motor magnet assembly end on the front surface of a substrate. The next operation is 1506 and includes aligning the first voice coil motor magnet assembly end to a second voice coil motor magnet assembly end on the front surface of a second substrate. The next operation is 1508 and includes attaching the first voice coil motor magnet assembly end to the second voice coil motor magnet assembly end on the front surface of the second substrate. The method ends in operation 1514.

Figure 16:
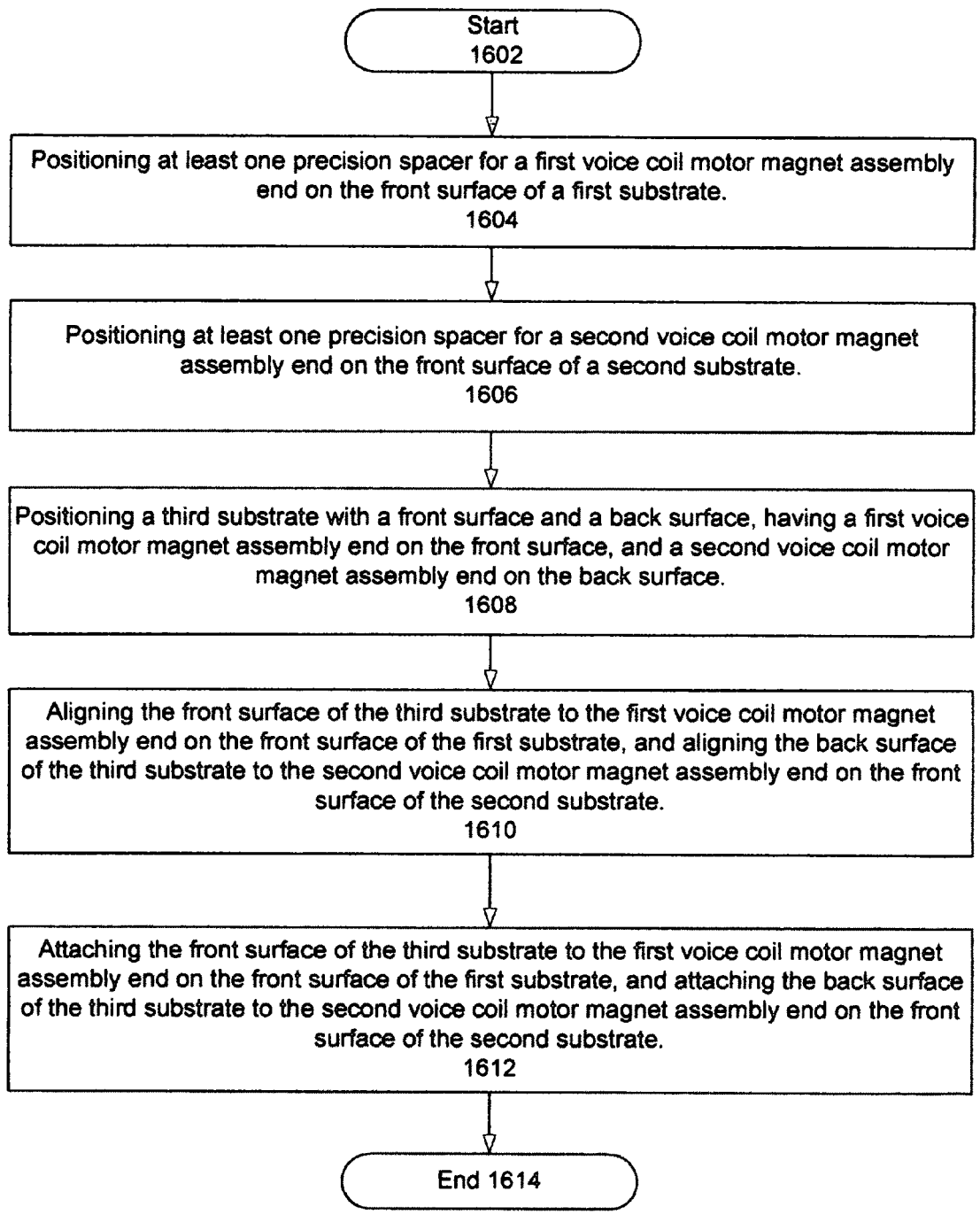
FIG. 16 illustrates a flowchart for making dual air gap voice coil motors, in accordance with one embodiment of the invention.

FIG. 16 illustrates a flowchart for making dual air gap voice coil motors, in accordance with one embodiment of the invention. The method begins in operation 1602. The next operation is 1604 and includes positioning at least one precision spacer for a first voice coil motor magnet assembly end on the front surface of a first substrate. The next operation is 1606 and includes positioning at least one precision spacer for a second voice coil motor magnet assembly end on the front surface of a second substrate. The next operation is 1608 and includes positioning a third substrate with a front surface and a back surface, having a first voice coil motor magnet assembly end on the front surface, and a second voice coil motor magnet assembly end on the back surface. The next operation is 1610 and includes aligning the front surface of the third substrate to the first voice coil motor magnet assembly end on the front surface of the first substrate, and aligning the back surface of the third substrate to the second voice coil motor magnet assembly end on the front surface of the second substrate. The next operation is 1612 and includes attaching the front surface of the third substrate to the first voice coil motor magnet assembly end on the front surface of the first substrate, and attaching the back surface of the third substrate to the second voice coil motor magnet assembly end on the front surface of the second substrate. The method ends in operation 1614.

CONCLUSIONS, RAMIFICATIONS AND SCOPE

Accordingly, various embodiments of invention are possible, which can provide high performance voice coil motors having either single or dual air gaps, and provide several advantages, such as:

fabrication of the motor magnetic returns by an electroplating process that produces a laminated film having high saturation magnetization and low eddy current loss at high frequencies.

fabrication of the magnetic returns on a high strength ceramic substrate.

fabrication of small and precise air gaps.

use of high energy Nd—Fe—B permanent magnets requiring high load lines.

fabrication of small and compact single and dual gap VCMs with high flux density in the air gap.

a high volume fabrication process.

Many variations of the invention are possible. For example, the substrate can be made from other materials, such as glass or stainless steel, and the magnetic returns can be electroplated with other materials having high magnetic saturation.

The exemplary embodiments described herein are for purposes of illustration and are not intended to be limiting. Therefore, those skilled in the art will recognize that other embodiments could be practiced without departing from the scope and spirit of the claims set forth below.

The invention claimed is:

1. A method to manufacture a plurality of voice coil motor magnetic returns on a substrate having a front surface and a back surface, comprising:
    depositing a conductive seed layer on said front surface of said substrate;
    depositing photoresist over said conductive seed layer on said front surface of said substrate;
    exposing and then developing said photoresist on said front surface of said substrate;
    depositing a plurality of alternating layers of a conducting material and a magnetic material over said photoresist over said front surface of said substrate;
    stripping said photoresist from said front surface of said substrate; and
    annealing said front surface of said substrate, wherein said annealing produces a plurality of voice coil motor magnetic returns having at least one selected magnetic property.

2. The method to manufacture a plurality of voice coil motor magnetic returns of claim 1, wherein said substrate includes ceramic material.

3. The method to manufacture a plurality of voice coil motor magnetic returns of claim 1, wherein said conductive seed layer includes a metal compound.

4. The method to manufacture a plurality of voice coil motor magnetic returns of claim 1, wherein said depositing a plurality of alternating layers of a conducting material and a magnetic material includes electroplating said conducting material and said magnetic material.

5. The method to manufacture a plurality of voice coil motor magnetic returns of claim 1, wherein said conducting material includes copper.

6. The method to manufacture a plurality of voice coil motor magnetic returns of claim 1, wherein said magnetic material includes a cobalt-iron-copper alloy.

7. The method to manufacture a plurality of voice coil motor magnetic returns of claim 1, further comprising:
    depositing a conductive seed layer on said back surface of said substrate;
    depositing photoresist over said conductive seed layer on said back surface of said substrate;
    exposing and then developing said photoresist on said back surface of said substrate;
    depositing a plurality of alternating layers of a conducting material and a magnetic material over said photoresist over said back surface of said substrate;
    stripping said photoresist from said back surface of said substrate; and
    annealing said back surface of said substrate, wherein said annealing produces a plurality of voice coil motor magnetic returns having at least one selected magnetic property.

8. A method to manufacture a plurality of voice coil motor magnetic returns, comprising:
    preparing a front surface and a back surface of a substrate for deposition;
    depositing a conductive seed layer on said front surface and said back surface of said substrate;
    depositing photoresist over said conductive seed layer on said front surface and said back surface of said substrate;
    exposing and then developing said photoresist on said front surface and said back surface of said substrate;
    depositing a plurality of alternating layers of a conducting material and a magnetic material over said photoresist over said front surface and said back surface of said substrate;
    stripping said photoresist from said front surface and said back surface of said substrate; and
    annealing said front surface and said back surface of said substrate, wherein said annealing produces a plurality of voice coil motor magnetic returns having at least one selected magnetic property.

9. The method to manufacture a plurality of voice coil motor magnetic returns of claim 8, wherein said substrate includes ceramic material.

10. The method to manufacture a plurality of voice coil motor magnetic returns of claim 8, wherein said conductive seed layer includes a metal compound.

11. The method to manufacture a plurality of voice coil motor magnetic returns of claim 8, wherein said depositing a plurality of alternating layers of a conducting material and a magnetic material includes electroplating said conducting material and said magnetic material.

12. The method to manufacture a plurality of voice coil motor magnetic returns of claim 8, wherein said conducting material includes copper.

13. The method to manufacture a plurality of voice coil motor magnetic returns of claim 8, wherein said magnetic material includes a cobalt-iron-copper alloy.

* * * * *